(12) United States Patent
Dunseath

(10) Patent No.: US 11,999,565 B1
(45) Date of Patent: Jun. 4, 2024

(54) ADJUSTABLE OVERHEAD MOUNTABLE STORAGE SYSTEM CONFIGURED TO RECEIVE STORAGE BINS

(71) Applicant: Dwayne Dunseath, Las Vegas, NV (US)

(72) Inventor: Dwayne Dunseath, Las Vegas, NV (US)

(73) Assignee: Dwayne Dunseath, Las Vegas, NV (US)

( * ) Notice: Subject to any disclaimer, the term of this patent is extended or adjusted under 35 U.S.C. 154(b) by 277 days.

(21) Appl. No.: 16/801,020

(22) Filed: Feb. 25, 2020

Related U.S. Application Data

(60) Provisional application No. 62/810,302, filed on Feb. 25, 2019.

(51) Int. Cl.
*B65G 1/04* (2006.01)
*B65G 1/02* (2006.01)

(52) U.S. Cl.
CPC .......... *B65G 1/0457* (2013.01); *B65G 1/026* (2013.01); *B65G 1/0471* (2013.01)

(58) Field of Classification Search
CPC .... B65G 1/026; B65G 1/0471; B65G 1/0457; A47B 43/003; A47B 2005/003; A47B 2230/0003; A47B 96/1466; A47B 96/1408; A47B 96/063; A47B 96/14; A47B 2051/005; A47B 47/0041; A47B 47/0058; A47F 5/00; A47F 5/08; A47F 5/0892; B25H 3/00; F16M 13/027
See application file for complete search history.

(56) References Cited

U.S. PATENT DOCUMENTS

| | | | | |
|---|---|---|---|---|
| 4,653,818 A * | 3/1987 | DeBruyn | ............... | A47B 77/16 211/113 |
| 5,359,542 A * | 10/1994 | Pahmeier | ............... | B25J 9/1615 356/621 |
| 5,402,860 A * | 4/1995 | Fry | ........................... | B25H 1/06 182/153 |
| 7,604,131 B1 * | 10/2009 | Clark | ....................... | B62H 3/12 211/118 |
| 7,832,568 B2 * | 11/2010 | Wu | ........................ | A47B 81/04 211/85.29 |
| 8,782,962 B1 * | 7/2014 | Schoewe | ............... | A47B 88/402 52/39 |
| 10,151,427 B2 * | 12/2018 | Mattson | ................. | A47B 81/00 |
| 2013/0199016 A1 * | 8/2013 | Found | .................... | A47B 88/40 29/428 |
| 2013/0228536 A1 * | 9/2013 | Crowley | .............. | A47B 43/003 211/26 |
| 2019/0202634 A1 * | 7/2019 | Vermeulen | ............. | B65G 1/026 |

* cited by examiner

*Primary Examiner* — Glenn F Myers

(74) *Attorney, Agent, or Firm* — Dickinson Wright PLLC

(57) ABSTRACT

A system including support rails attachable to a rigid overhead structure and I-beam tracks configured to slidably attach to the support rails in a spaced relationship to hold storage bins in a hanging fashion. The support rails include support rail extensions on at least one end thereof for joining to a proximate support rail and the I-beam tracks include I-beam extensions on one end thereof for joining to a proximate I-beam track.

10 Claims, 15 Drawing Sheets

ADJUSTABLE OVERHEAD MOUNTABLE STORAGE SYSTEM CONFIGURED TO RECEIVE STORAGE BINS

CROSS REFERENCE

This application claims priority to U.S. Patent Application No. 62/810,302 filed Feb. 25, 2019 which is incorporated herein by reference for all purposes.

FIELD OF THE INVENTION

The embodiments of the present invention relate to an overhead storage system mountable to a ceiling or other overhead structure and configured to receive storage bins.

BACKGROUND

Storage space is very much at a premium in most homes, including garages.

Unfortunately, after vehicles are parked in the garage, available storage space is lacking. In most cases, the space proximate the ceiling is available even when vehicles are parked in the garage. In other words, vehicles are not typically tall enough to occupy the space proximate the garage ceiling.

It would thus be advantageous to develop a storage system mountable on a ceiling or other overhead structure.

SUMMARY

One embodiment of the present invention is directed to a system comprising at least two support rails attachable to a rigid overhead structure to a rigid in a parallel spaced arrangement; at least two I-beam tracks, each I-beam track configured to slidably attach to each of said at least two support rails in a spaced relationship, said at least two I-beam tracks each having lower platforms defining a path in said spaced relationship to receive and support opposite ends of one or more storage bins such that each of said I-beam tracks collectively support each of said one or more storage bins; and wherein said support rails include support rail extensions on at least one end thereof for joining to a proximate support rail and said I-beam tracks include I-beam extensions on at least one end thereof for joining to a proximate I-beam track.

Another embodiment comprises a system comprising: a plurality of support rails configured for attachment to a rigid overhead structure in a parallel spaced arrangement, said support rails each having an open end and an end having a support rail extension, said support rail extensions configured to slide into an open end of, and connect to, a proximately positioned support rail; and a plurality of I-beam tracks, each I-beam track configured to slidably attach to at least two of said plurality of support rails in said parallel spaced arrangement, said I-beam tracks each having an open end and an end having an I-beam extension, said I-beam track extensions configured to slide into an open end of, and connect to, a proximately positioned I-beam track.

Advantageously, the support rails and I-beam tracks are configured such that the I-beam tracks attach to said support rails in an angled manner relative to said support rails. Such a relationship is more versatile than a simple orthogonal relationship.

Other variations, embodiments and features of the present invention will become evident from the following detailed description, drawings and claims.

DETAILED DESCRIPTION

Figure 1A:
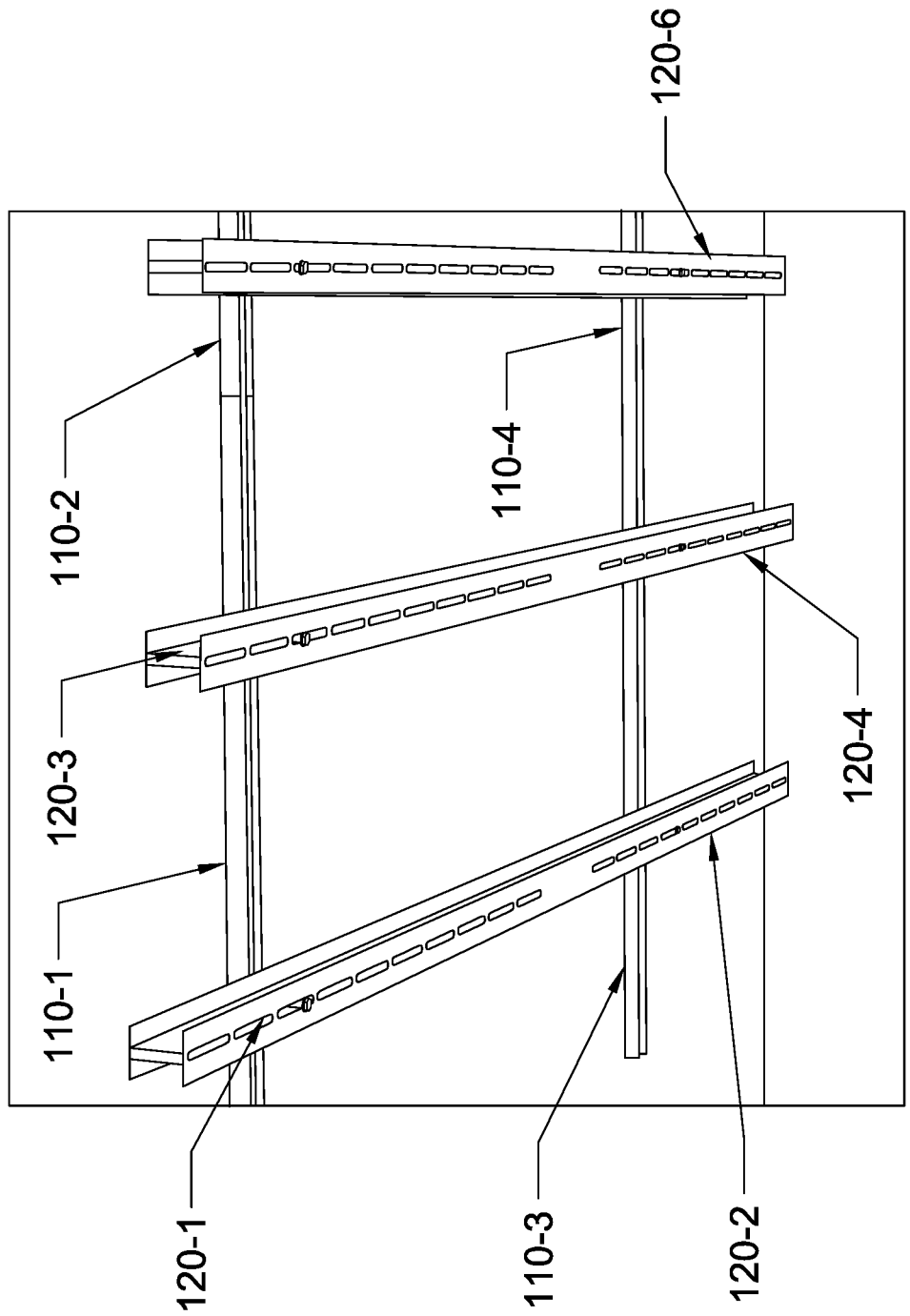
FIGS. 1A and 1B illustrate a storage system installed on a ceiling according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention, as described below in more detail, involve an overhead storage system comprising broadly a series of support rails attachable to an overhead structure (e.g., ceiling) and a series of I-beam tracks movably attachable thereto allowing the I-beam tracks to slide along the support rails changing the distance between neighboring I-beam tracks to accommodate different sizes of storage bins. The components of the storage system detailed herein may be fabricated of any suitable materials including, but not limited to, metals, alloys, composites, woods, plastics, etc., and may be fabricated using any suitable technique including, but not limited to, machining, molding, machining and additive processes.

Figure 1B:
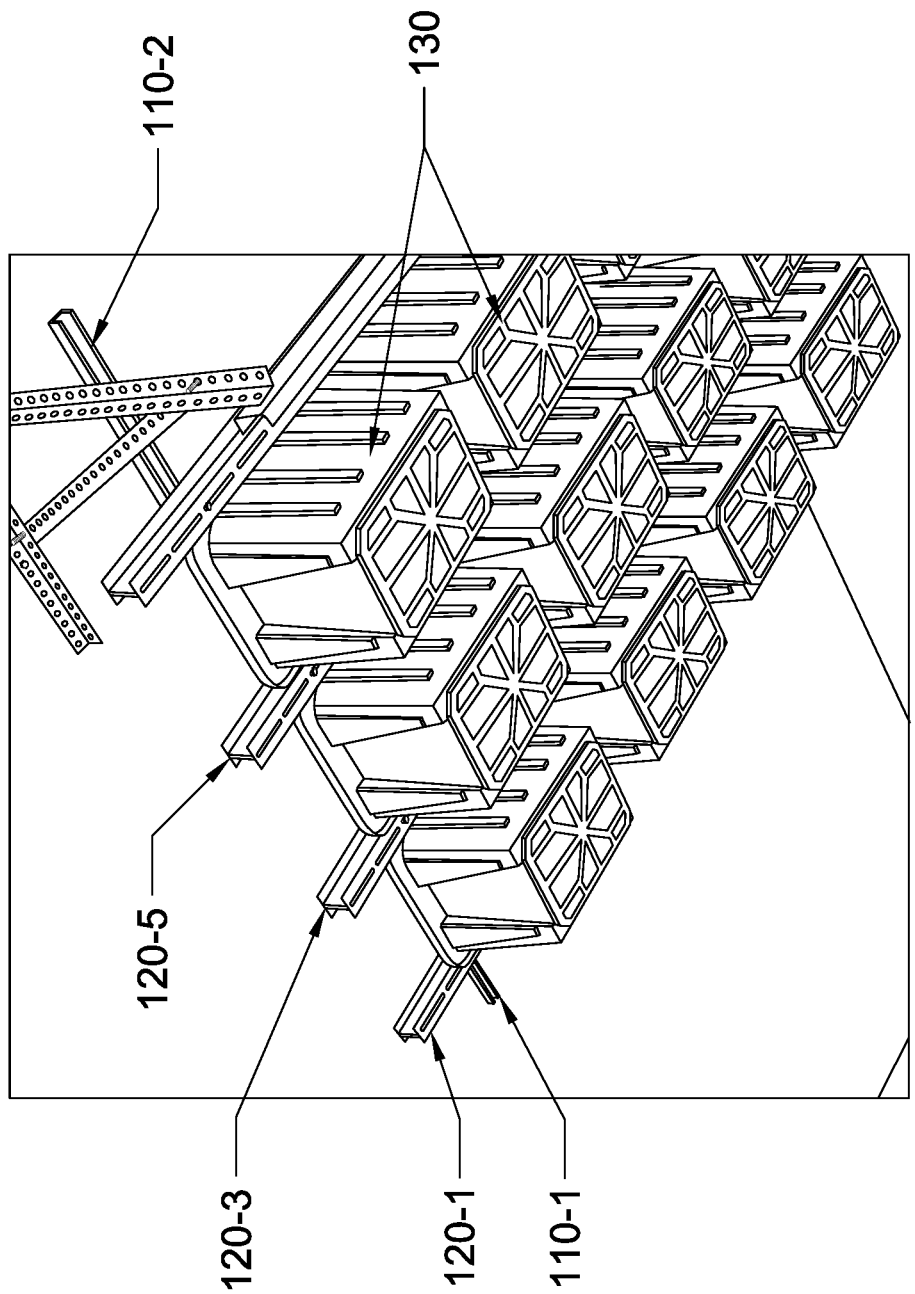

FIGS. 1A and 1B illustrate a storage system 100 installed on a ceiling according to the embodiments of the present invention. The storage system 100 shown in FIG. 1A includes multiple support rails 110-1 through 110-4 and multiple I-beam tracks 120-1 through 120-6. Individual supports rails 110-1 and 110-2 may be joined to create a longer collective rail and individual I-beam tracks 120-1 and 120-2; 120-3 and 120-4; and 120-5 and 120-6 may be joined to create longer collective I-beam tracks. Individual support rails 110-1 and 110-3 in conjunction with I-beam tracks 120-1 and 120-3 may also form a complete, albeit smaller, overhead storage system. FIG. 1B shows storage bins 130 hanging from neighboring I-beam tracks. Specifically, two lower platforms of neighboring I-beam tracks slidably receive opposite ends of one or more storage bins.

Figure 2A:
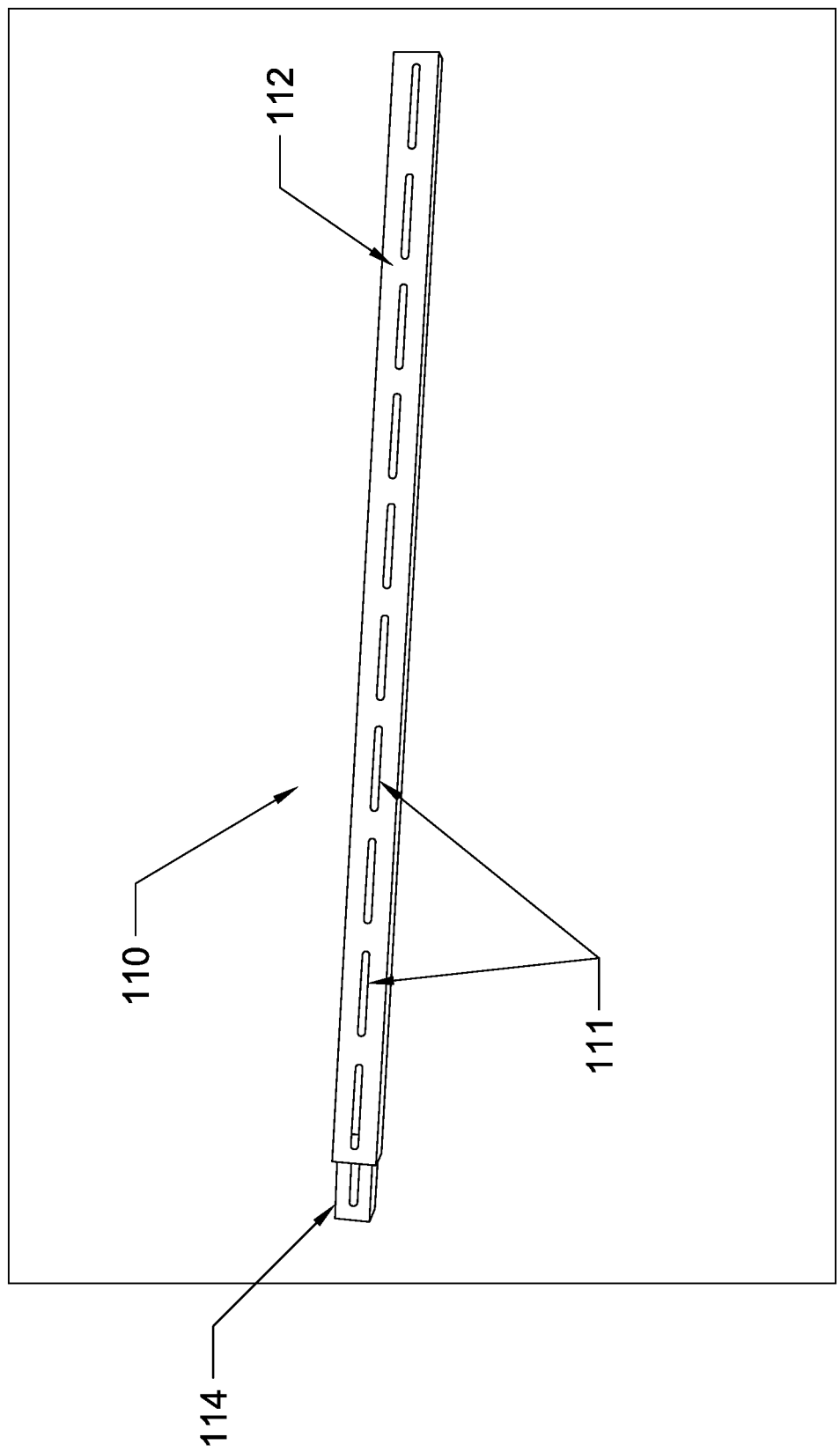
FIGS. 2A through 2C illustrate a support rail according to the embodiments of the present invention.
Figure 2B:
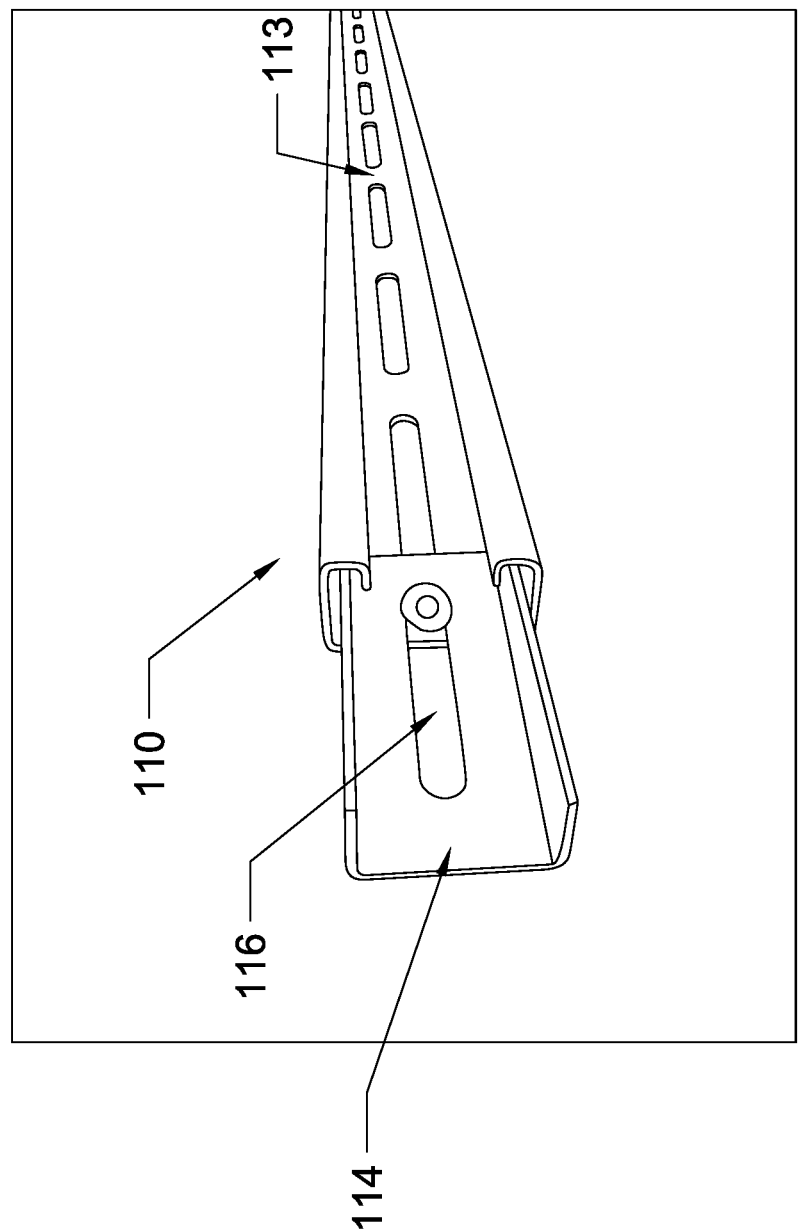
Figure 2C:
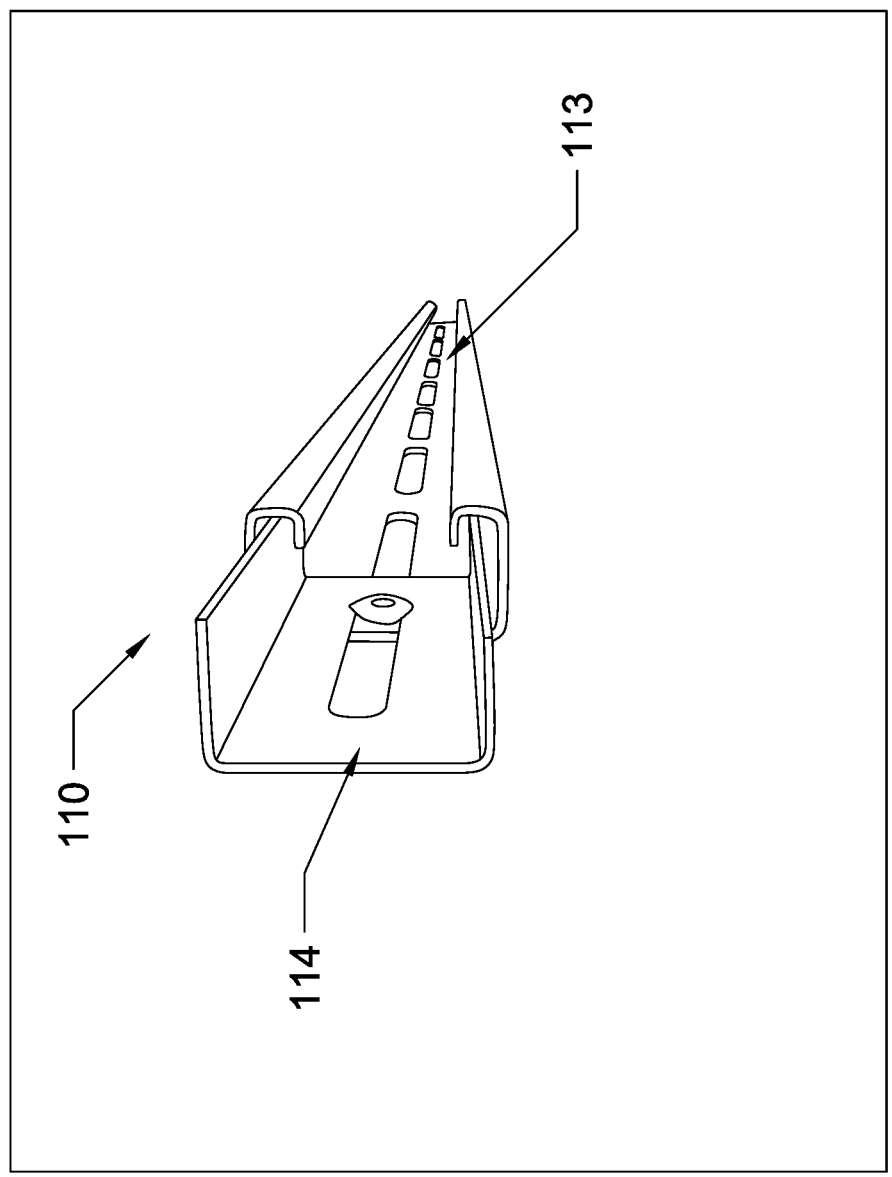
Figure 3A:
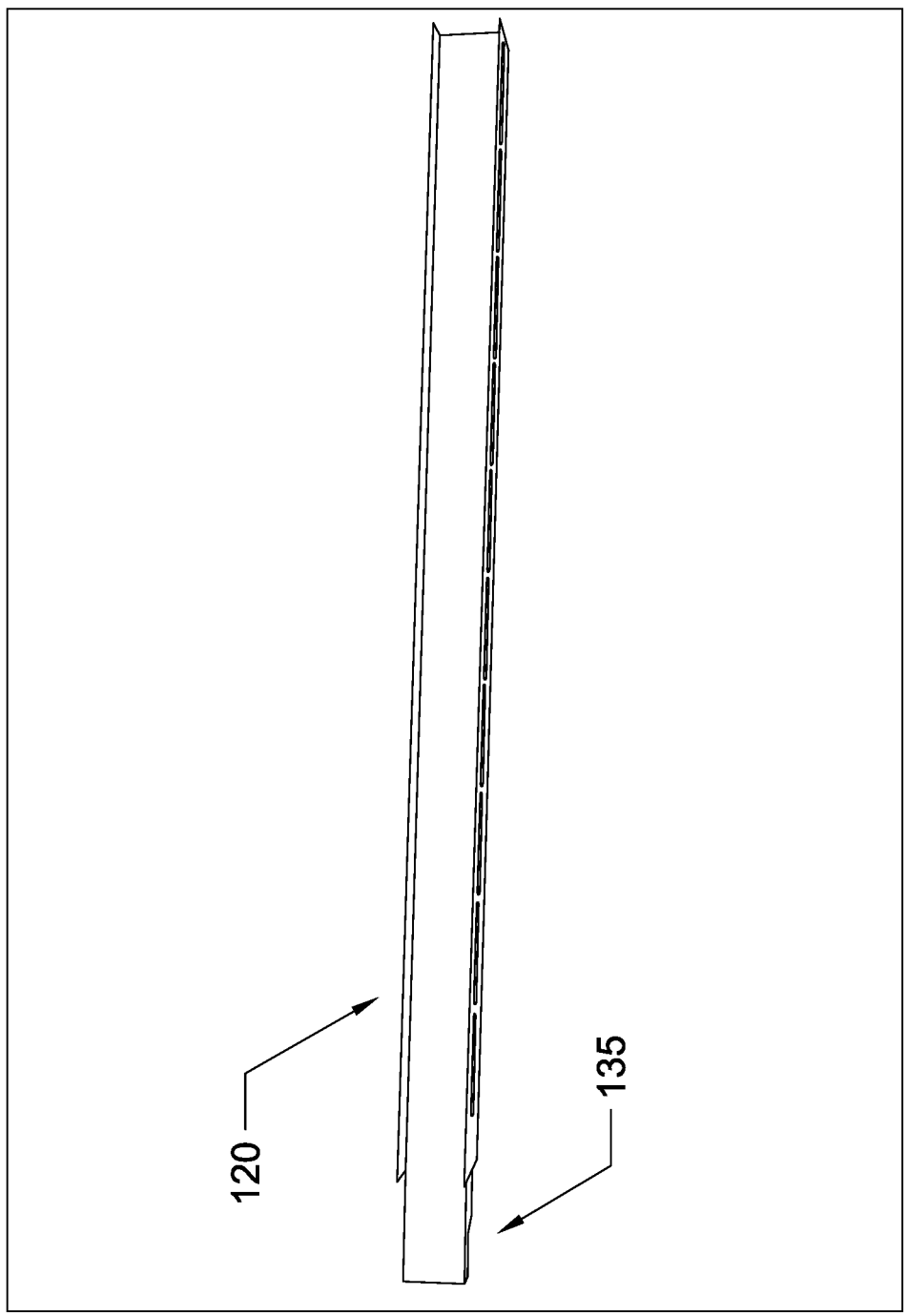
FIGS. 3A through 3F illustrate an I-beam track according to the embodiments of the present invention.
Figure 3B:
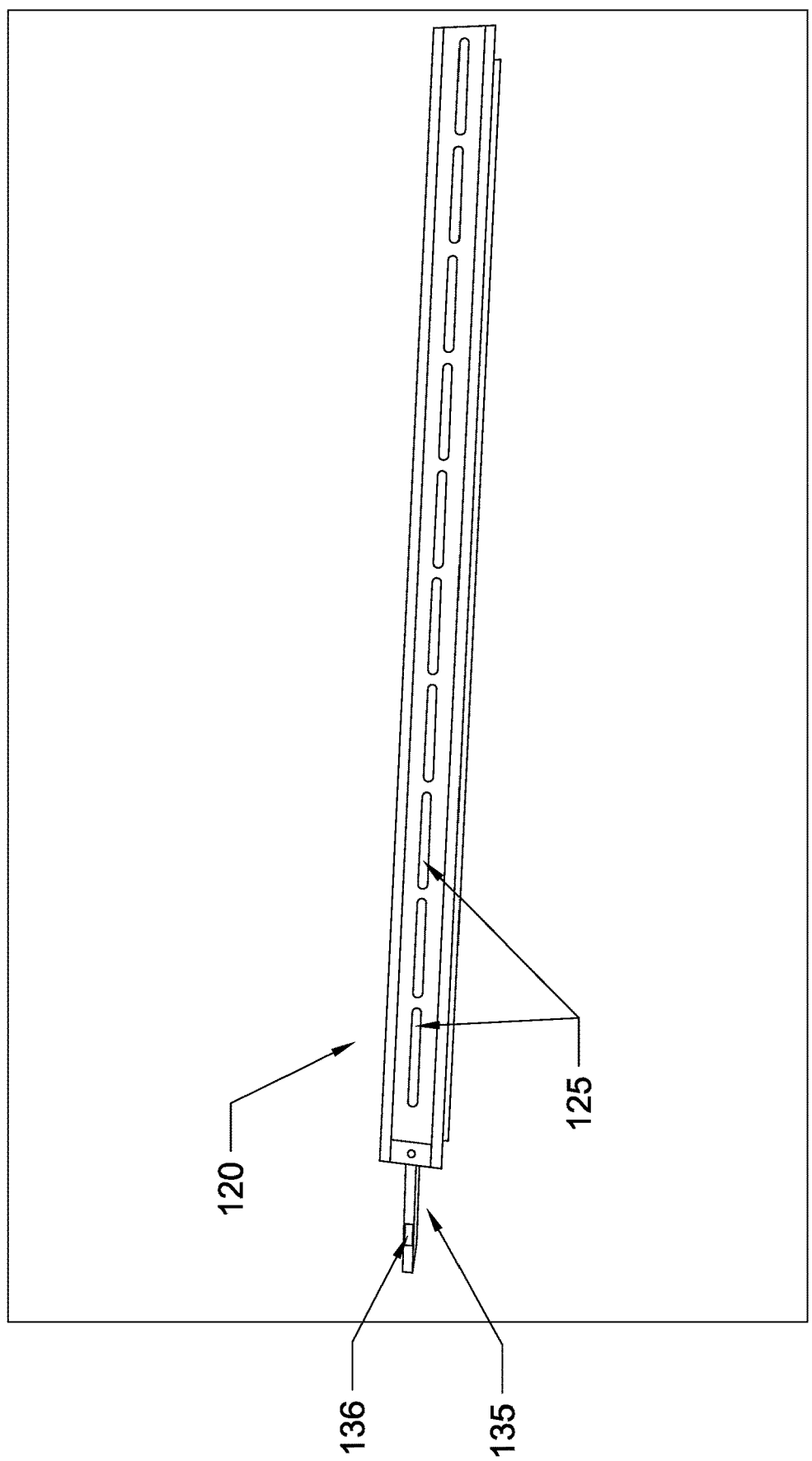
Figure 3C:
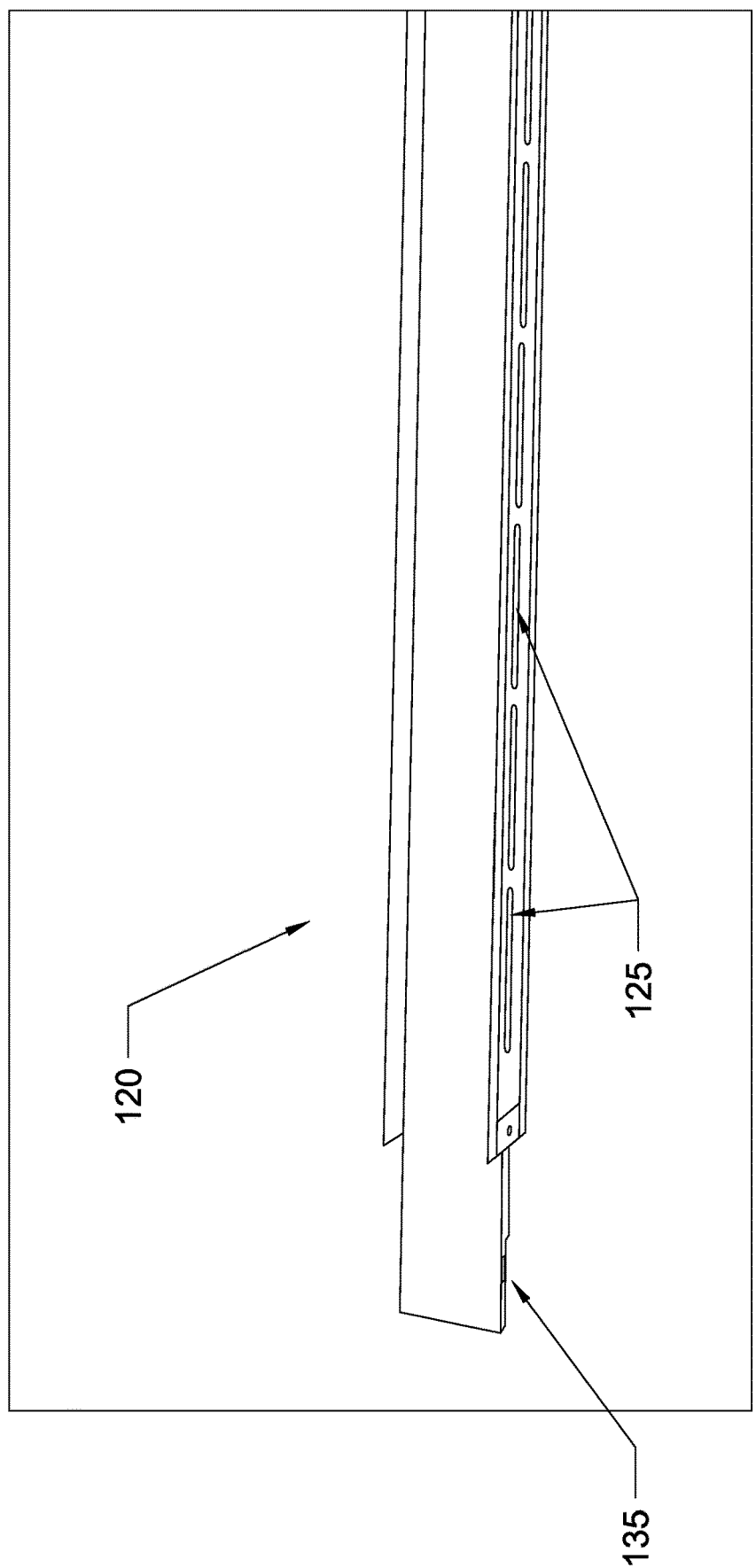
Figure 3D:
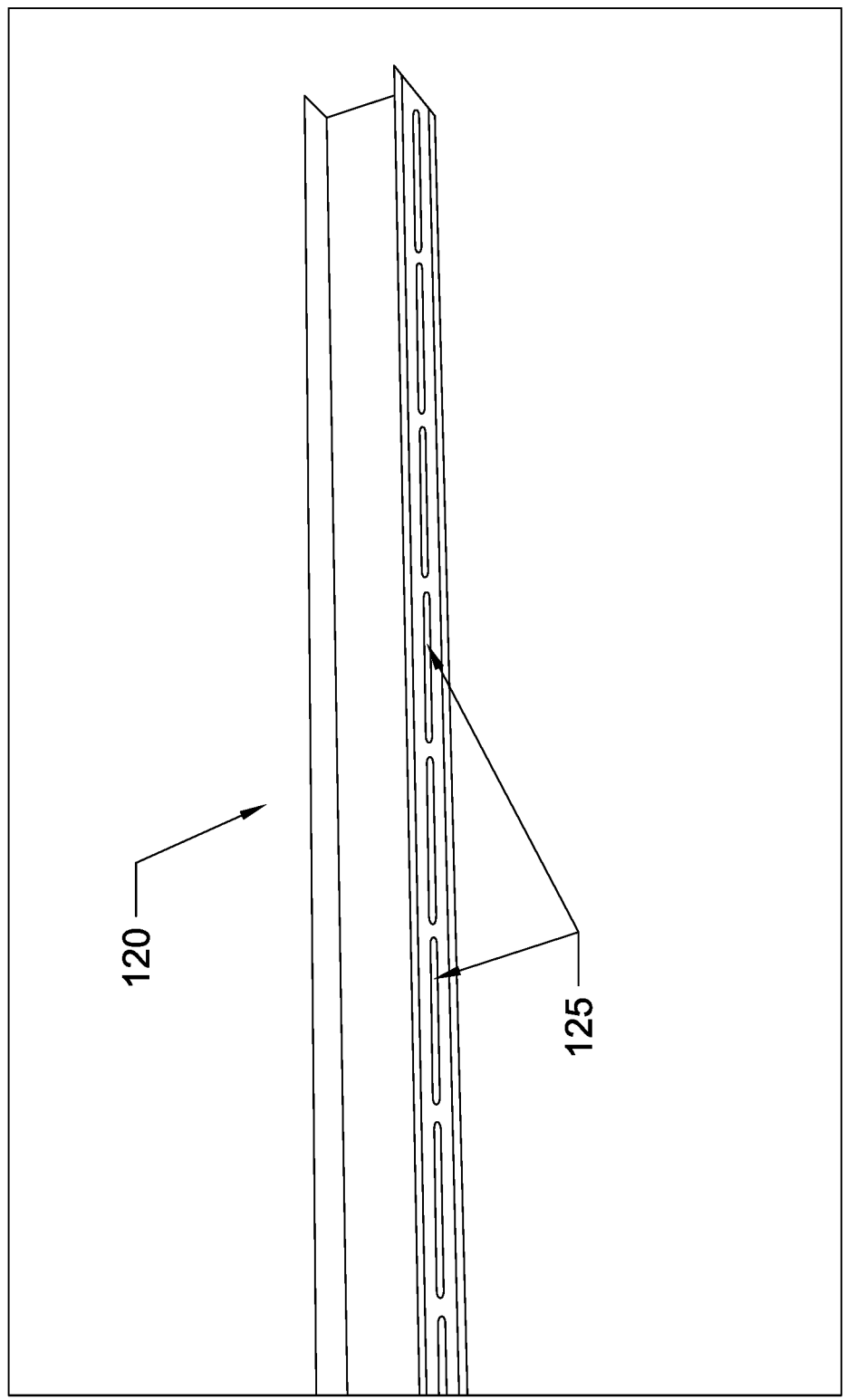
Figure 3E:
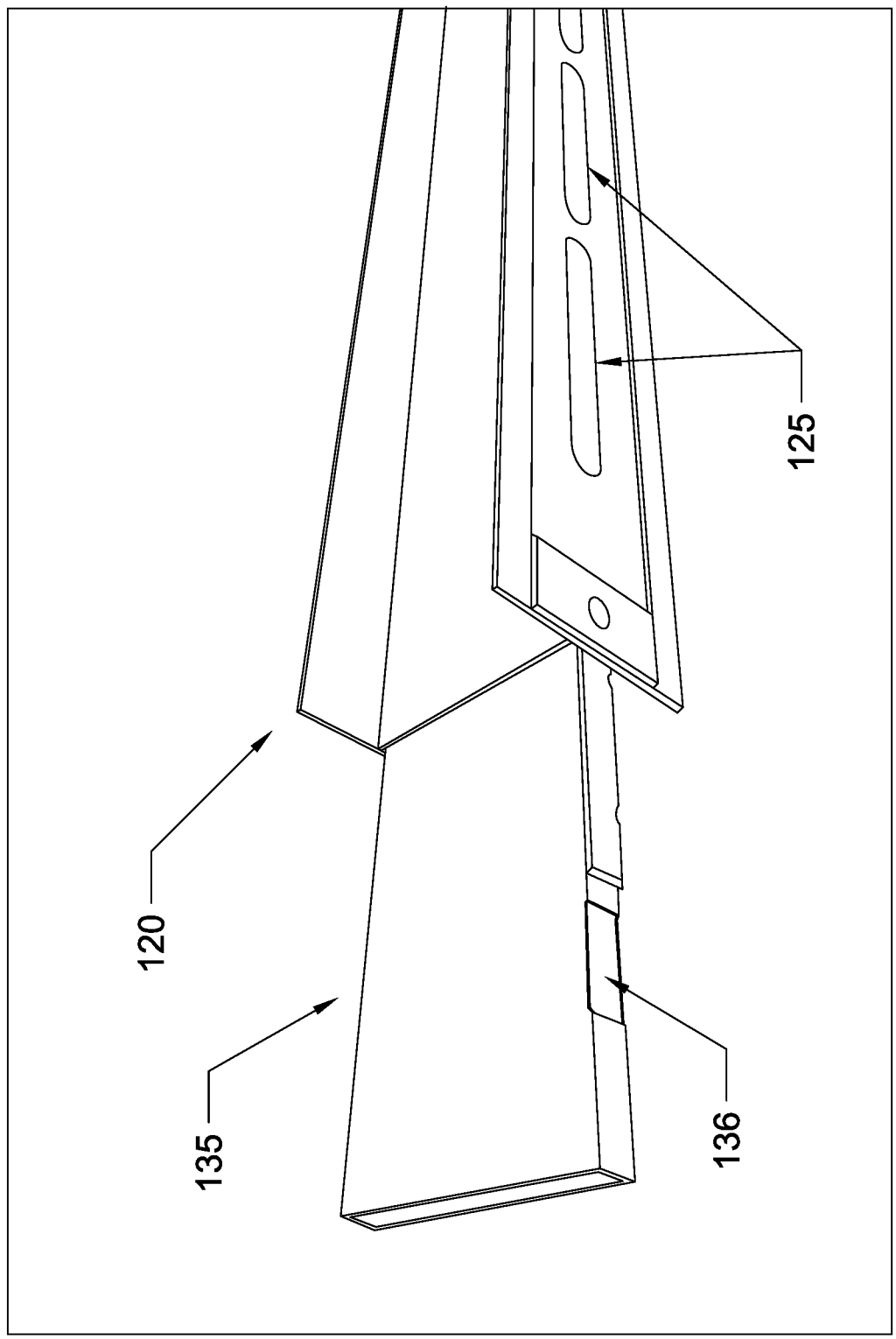
Figure 3F:
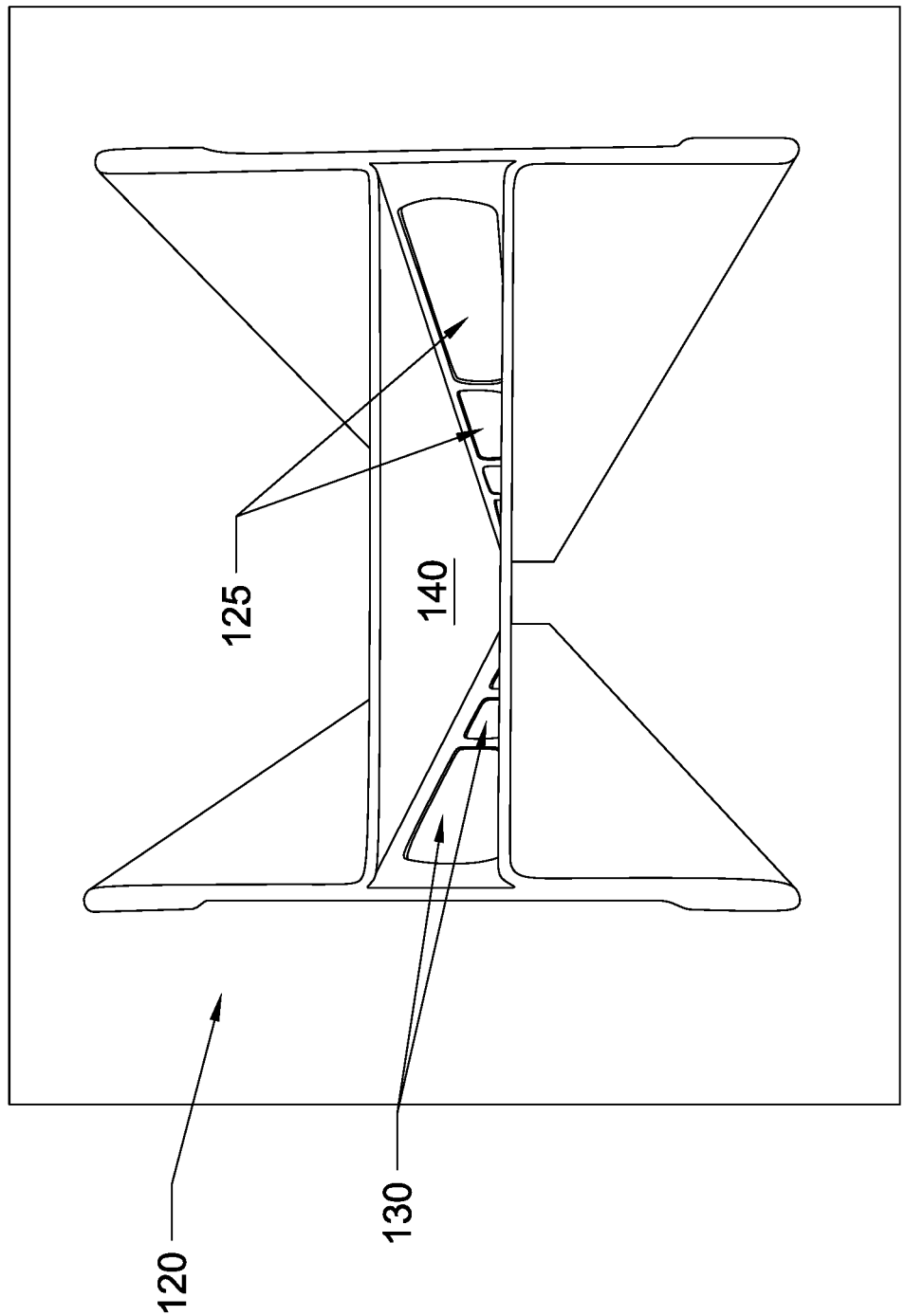
Figure 4A:
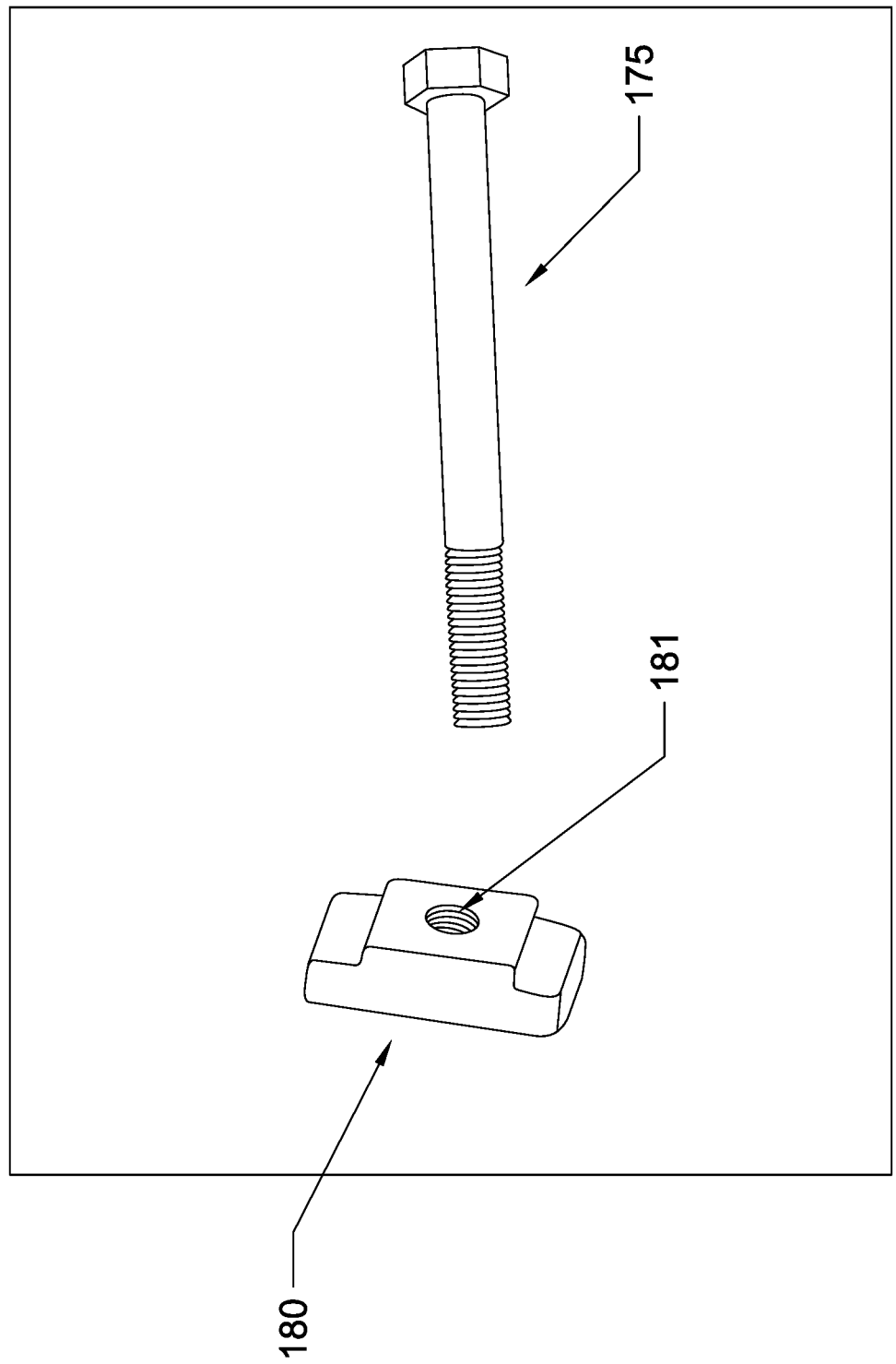
FIGS. 4A through 4D illustrate an exemplary mechanism for connecting the I-beam tracks to the support rails according to the embodiments of the present invention.
Figure 4B:
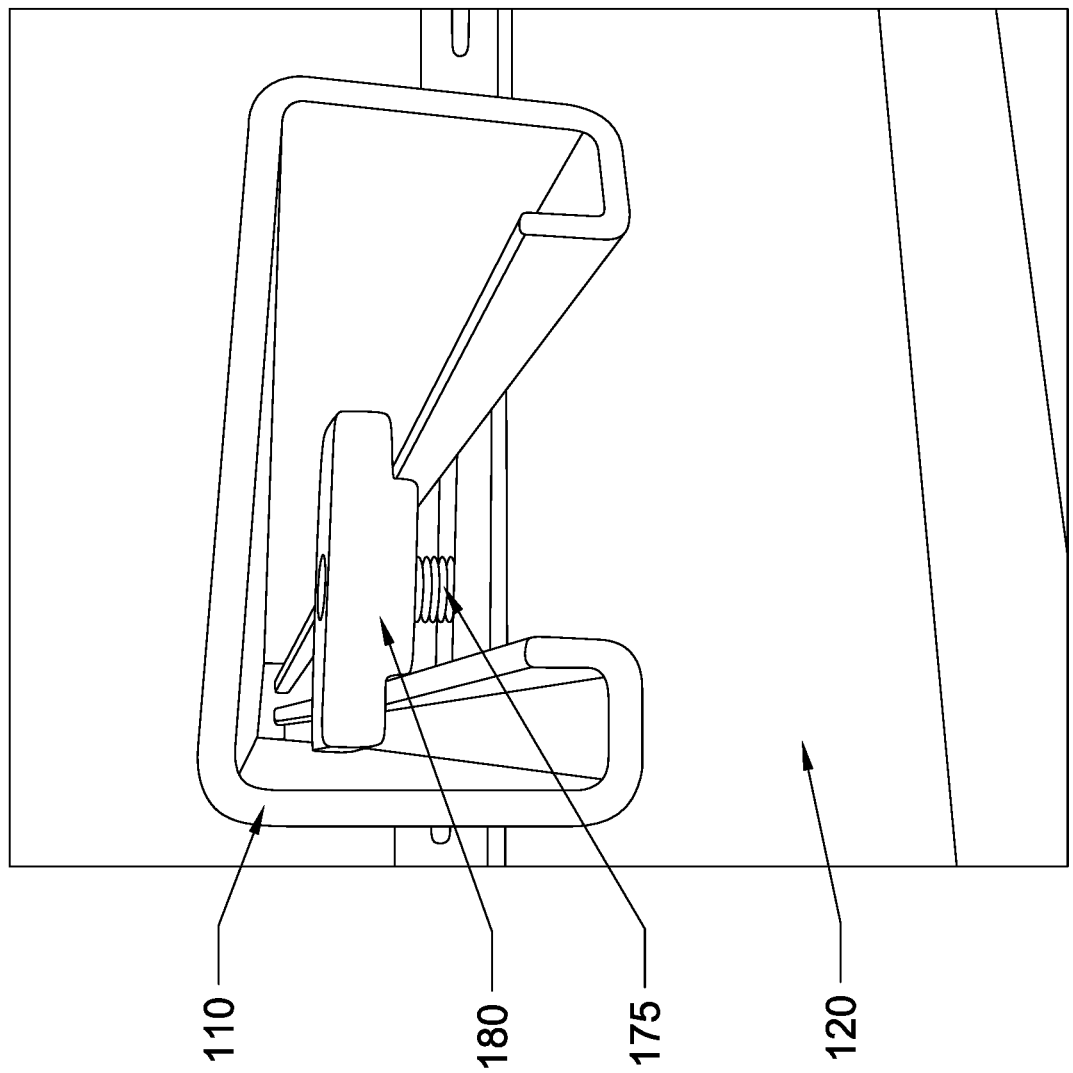
Figure 4C:
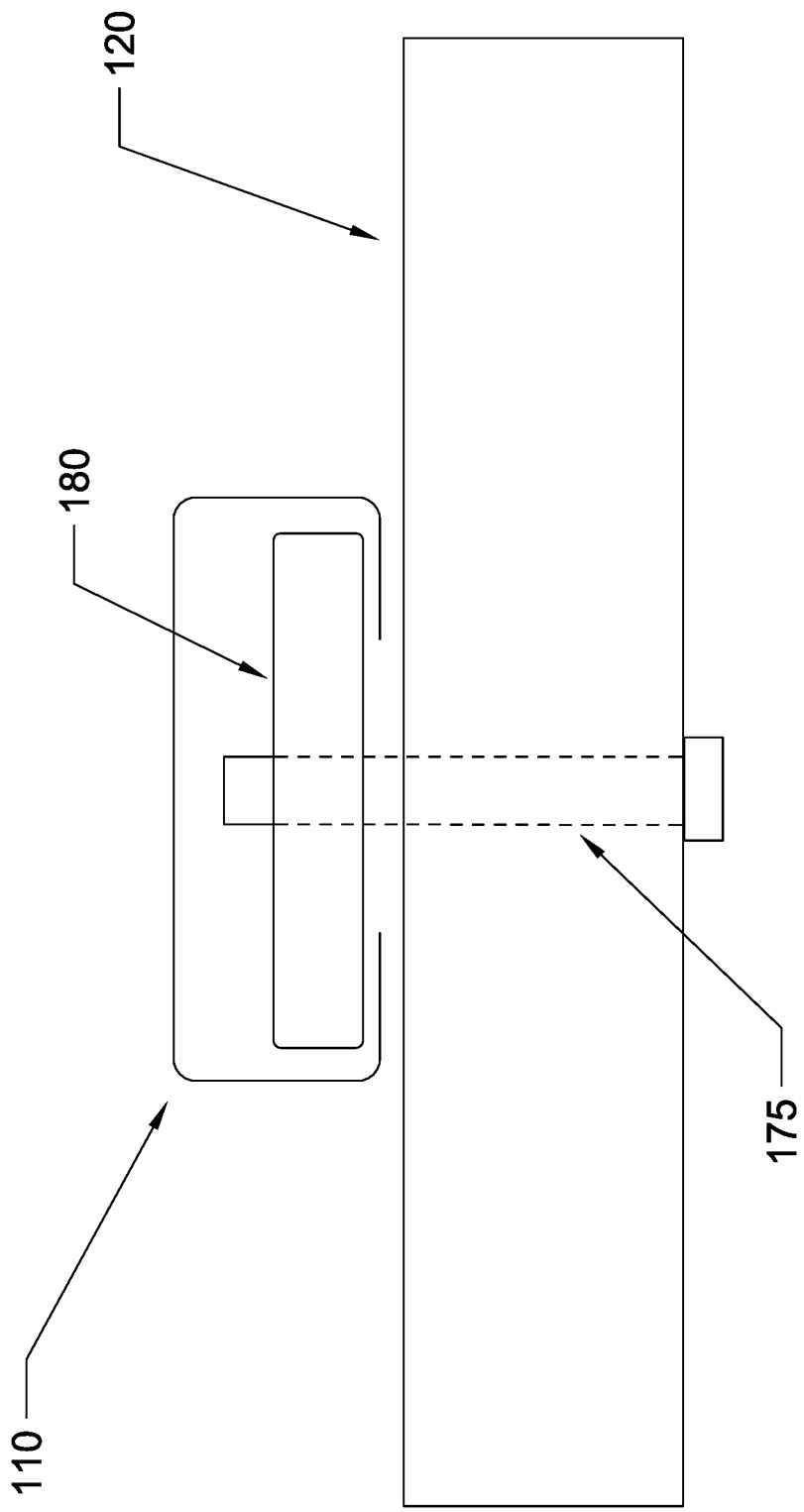
Figure 4D:
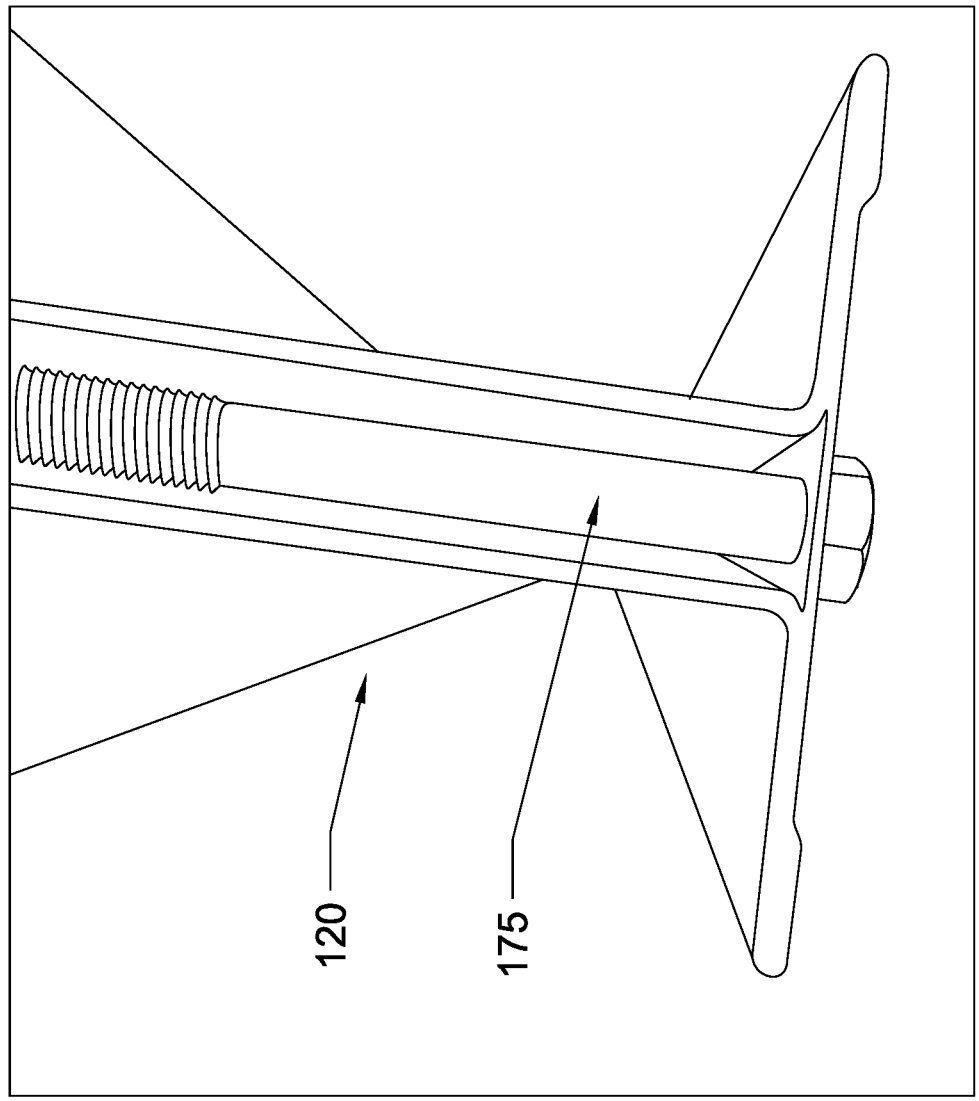

FIGS. 2A through 2C show the support rail 110 according to the embodiments of the present invention. Each support rail 110 includes a series of openings 111 along a back 112 thereof. The openings 111 facilitate attachment via screws, bolts, etc., to a ceiling or other rigid structure. An underside of the support rail 110 defines an elongated groove 113 which, as detailed below, acts as a path for adjusting the position of connected I-beam tracks 120. An extension member 114 at one end of the support rail 110 is dimensioned to slide into the groove of a second support rail to create a longer collective support rail as shown in FIGS. 1A and 1B. An opening 116, which aligns with an opening 111 in an adjoining support rail, in the extension member 114 permits securing two support rails to one another via a connector means such as a nut and bolt.

FIGS. 3A through 3F show the I-beam track 120 according to the embodiments of the present invention. The I-beam track 120 includes a series of openings 125, 130 along opposite edges thereof through which a bolt may pass to connect the I-beam track 120 to the support rail 110 as detailed below. An extension member 135 at one end of the I-beam track 120 is dimensioned to slide into a space 140 of a second I-beam track to create a longer collective I-beam track as shown in FIGS. 1A and 1B. An opening 136, which aligns with openings 125, 130 in an adjoining I-beam track, in the extension member 135 permits securing two I-beam tracks to one another via a connector means such as a nut and bolt.

FIGS. 4A through 4D show an exemplary mechanism for connecting the I-beam tracks to the support rails according to the embodiments of the present invention. A bolt 175 and slider 180 serve to slidably attach the I-beam tracks 120 to the support rails 110. To connect the I-beam track 120 to the support rail 110 comprises (i) sliding the bolt 175 through corresponding openings 125 and 130 in the I-beam track 120 and through an opening 111 in the support rail 110; (ii) sliding the slider 180 into proper position in support rail groove 140; (iii) threading the bolt into the threaded cavity 181 of slider 180. To secure the I-beam 120 in place on the support rail 110, the bolt 175 may be tightened completely until the slider 180 creates downward pressure on the support rail 110 securing the I-beam 110 in place. Loosening the bolt 175 then permits the I-beam to once again slide along the support rail 110 for re-positioning as needed.

Although the invention has been described in detail with reference to several embodiments, additional variations and modifications exist within the scope and spirit of the invention as described and defined in the following claims.

What is claimed is:

1. A system comprising:
   at least two support rails attachable to a rigid overhead structure in a parallel spaced arrangement;
   at least two I-beam tracks, each I-beam track configured to slidably attach to each of said at least two support rails in a spaced relationship, said at least two I-beam tracks each having lower platforms defining a path in said spaced relationship to receive and support opposite ends of one or more storage bins such that each of said I-beam tracks collectively support each of said one or more storage bins; and
   wherein said support rails include support rail extensions on at least one end thereof for joining to a proximate support rail and said I-beam tracks include I-beam extensions on at least one end thereof for joining to a proximate I-beam track,
   wherein said I-beam track extensions have rectangular cross-section and are configured to slide into an open end of said proximate I-beam track opposite an end having said I-beam extension.

2. The system of claim 1, wherein said support rails have a U-shaped cross-section.

3. The system of claim 2, wherein said support rail extensions are U-shaped and configured to slide into an open end of said proximate support rail opposite an end having said support rail extension.

4. The system of claim 1, wherein said support rail extensions include openings for receiving one or more fasteners for connecting two support rails to one another.

5. The system of claim 1, wherein said I-beam track extensions include openings for receiving one or more fasteners for connecting two I-beam tracks to one another.

6. A system comprising:
   at least two support rails attached to a rigid overhead structure in a parallel spaced arrangement;
   at least two I-beam tracks, each of said I-beam tracks slidably attached to each of said at least two support rails in a spaced relationship, said at least two I-beam tracks each having lower platforms defining a path in said spaced relationship to receive and support opposite ends of one or more storage bins such that each one of said at least two I-beam tracks collectively supports each of said one or more storage bins; and
   wherein said support rails include support rail extensions on at least one end thereof for joining to a proximate support rail and said I-beam tracks include I-beam extensions on at least one end thereof for joining to a proximate I-beam track,
   wherein said I-beam track extensions have rectangular cross-sections and are configured to slide into an open end of said proximate I-beam track opposite an end having said I-beam extension.

7. The system of claim 6, wherein said support rails have a U-shaped cross-section.

8. The system of claim 7, wherein said support rail extensions are U-shaped and configured to slide into an open end of said proximate support rail opposite an end having said support rail extension.

9. The system of claim 6, wherein said support rail extensions include openings for receiving one or more fasteners for connecting two support rails to one another.

10. The system of claim 6, wherein said I-beam track extensions include openings for receiving one or more fasteners for connecting two I-beam tracks to one another.

* * * * *